Sept. 9, 1930.  M. BOUCHER ET AL  1,775,583
LANDING DEVICE FOR AIRCRAFT
Filed Jan. 18, 1929  4 Sheets-Sheet 1

M. Boucher &
R. Bernady
INVENTORS

By:

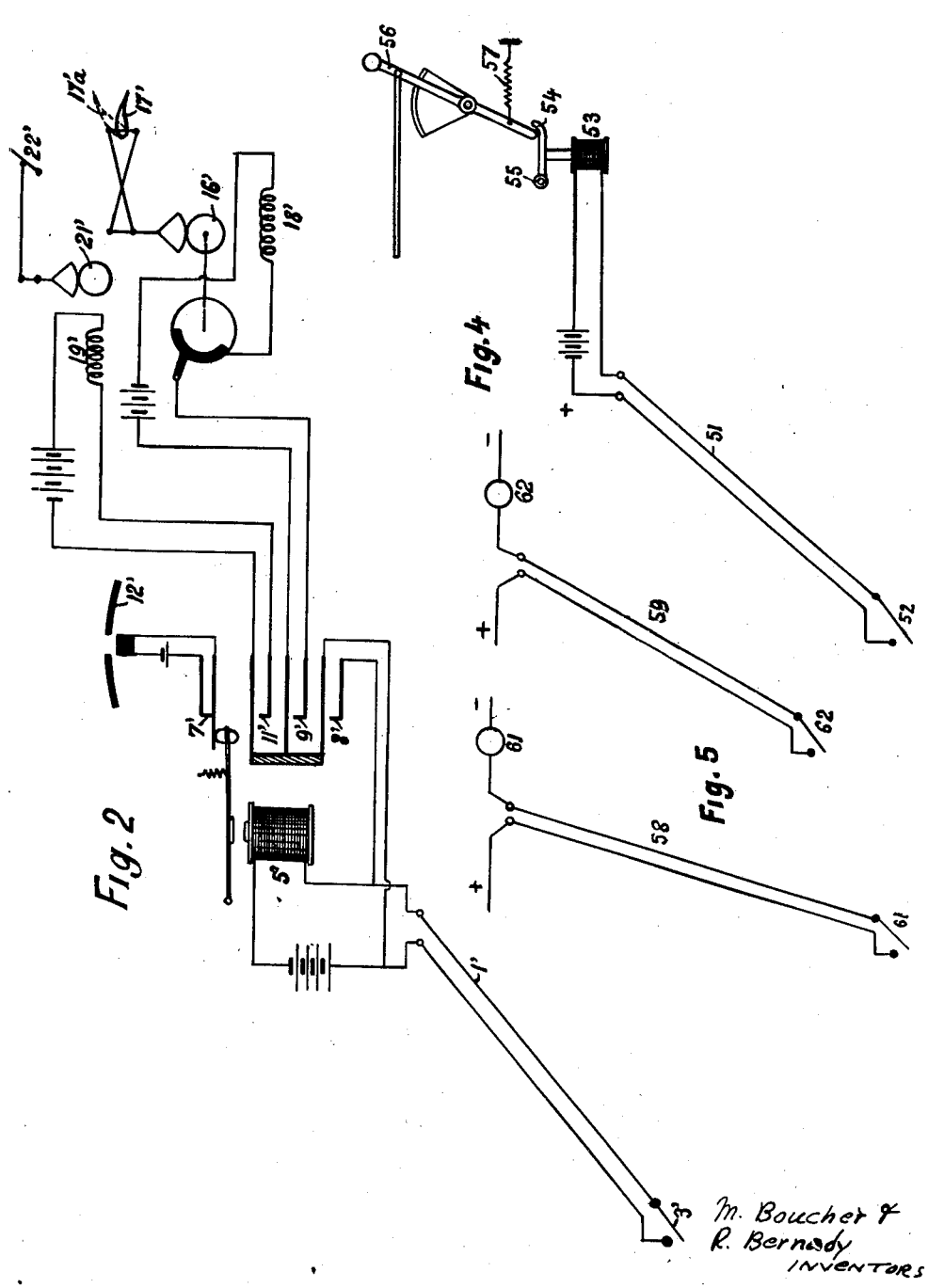

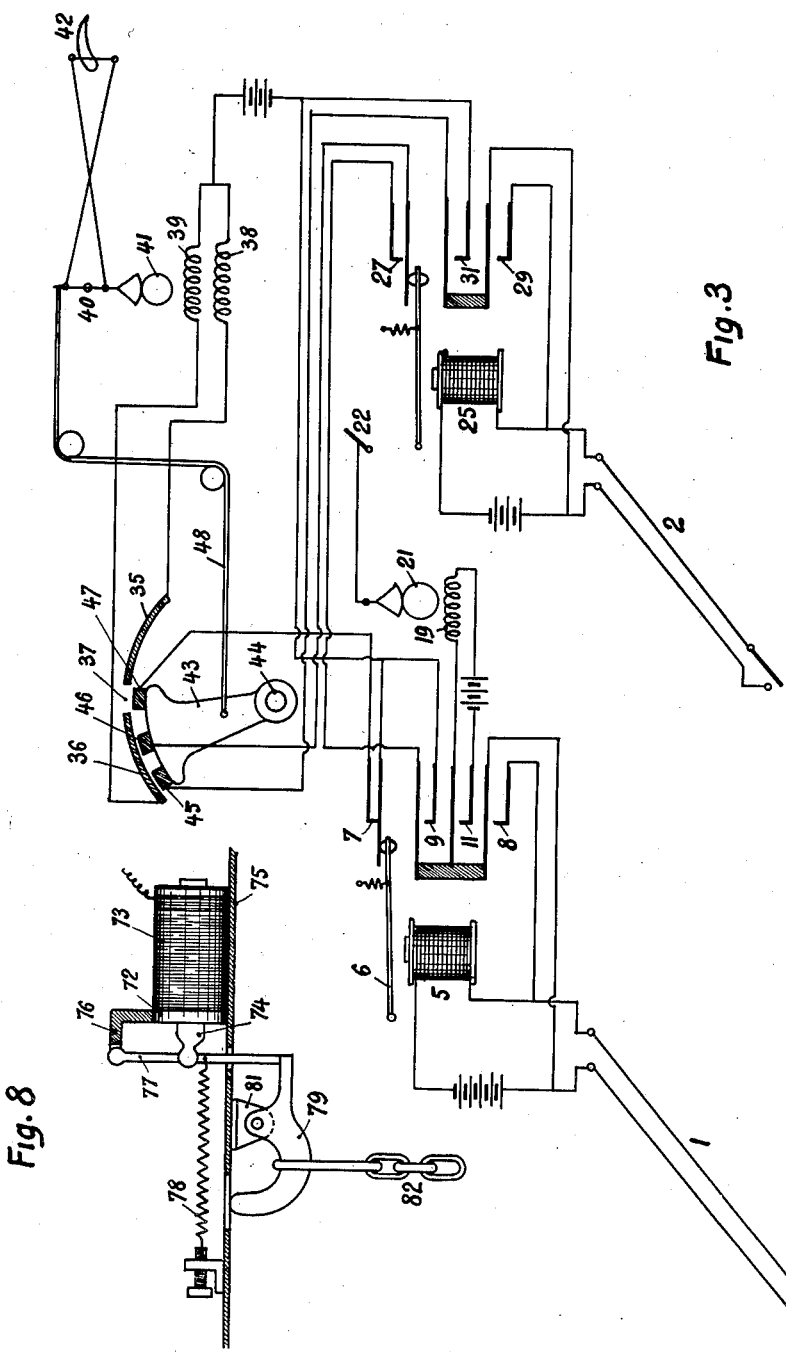

Sept. 9, 1930.　　　M. BOUCHER ET AL　　　1,775,583
LANDING DEVICE FOR AIRCRAFT
Filed Jan. 18, 1929.　　4 Sheets-Sheet 4
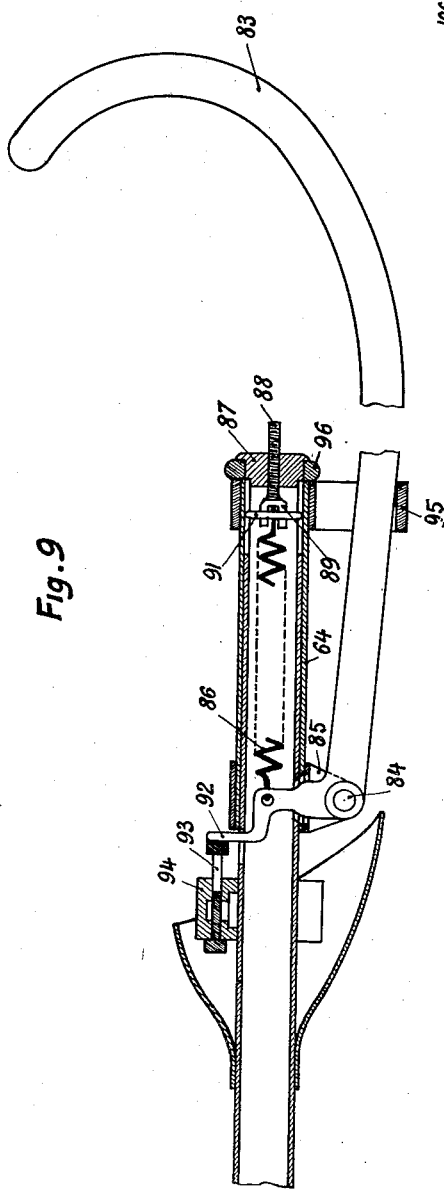

Patented Sept. 9, 1930

1,775,583

UNITED STATES PATENT OFFICE

MAX BOUCHER AND RAOUL BERNADY, OF NEUILLY-SUR-SEINE, FRANCE, ASSIGNORS TO SOCIÉTÉ D'ETUDE ET DE CONSTRUCTION D'APPAREILS DE TÉLÉMÉCANIQUE, OF NEUILLY-SUR-SEINE, FRANCE, A CORPORATION OF FRANCE

LANDING DEVICE FOR AIRCRAFT

Application filed January 18, 1929, Serial No. 333,488, and in France January 25, 1928.

Our invention has for its object a device for facilitating the landing of aircraft either by merely warning the pilot of his nearing ground so as to allow him to take the necessary steps for landing when required or by providing automatically for these steps. The main feature of this device resides in that it comprises one or more parts which in their normal collapsed state are disposed against the aeroplane or the like and when released project a little below the landing wheels so that they meet the ground a little before the aircraft itself, and cause thereby the making or breaking of circuits comprising any desired indicating or operating devices.

Generally we provide several of these devices or feelers projecting to a different extent underneath the aircraft and adapted to come successively in contact with the ground whereby the complete landing may be effected in several steps. Preferably two such devices are provided, of which one determines an increase of the inclination and a slowing down of the motor and the other makes the aircraft point upwards to a greater degree.

For certain aeroplanes a third device, shorter than the preceding ones, may throw out of gear the auxiliary steering motors just before the wheels of the aeroplane touch the ground.

Several electric arrangements allow these landing operations to be provided automatically.

A much simpler system would obviously consist in the use of these devices for lighting indicating lamps so as to warn the pilot of his distance above ground.

Two principal preferred forms of execution have been imagined for the feelers. These may consist of rods pivotally secured to the underside of the aircraft and carrying a plough share which when meeting the ground produces the required contacts, suitable means being provided for adjusting the incline of the rod according to the wind, for damping the shocks due to its release or to its contact with the ground etc. But it is often more practical to use cable antennæ hanging underneath the aircraft and weighted preferably by means of a number of weights removed from each other and causing the desired operations when they reach the ground.

We have described hereinbelow and shown on appended drawings several forms of execution of our invention.

Fig. 2 shows a simplified form thereof with a single part adapted to come into contact with the ground.

Fig. 3 shows a modification using only a balancer.

Fig. 4 shows diagrammatically the arrangement used for controlling the landing of certain aeroplanes.

Fig. 5 is a diagram of the indicating lamps.

Fig. 6 shows diagrammatically a contacting rod.

Fig. 7 shows diagrammatically a device for adjusting the incline of the rod.

Fig. 8 shows the electric release system for the rod.

Fig. 9 shows a form of execution of one end of the rod.

Fig. 10 shows a feeler constituted by an antenna adapted to be unwound.

Figure 1:
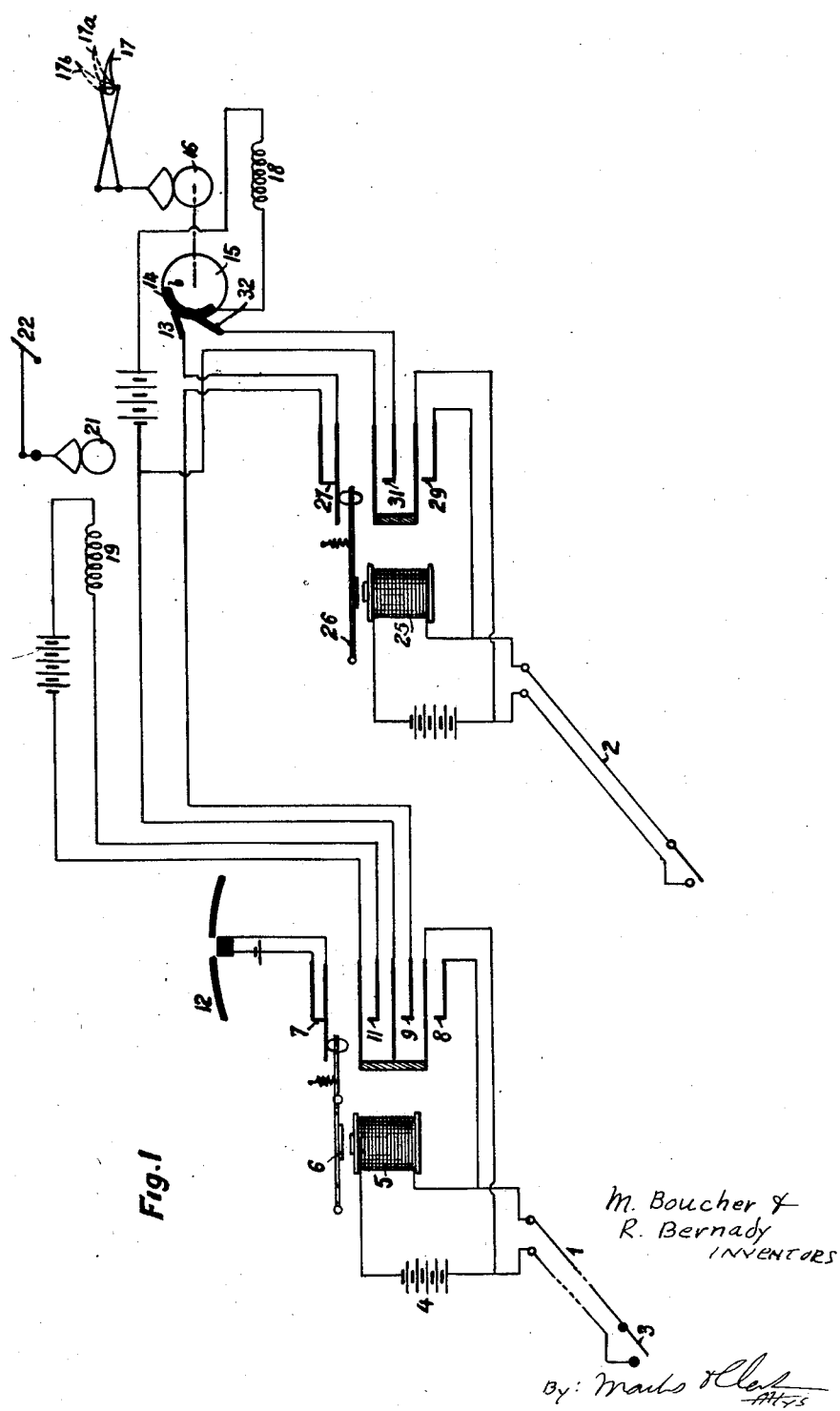
Fig. 1 shows diagrammatically a complete electric landing arrangement.

On Fig. 1, the ground contacting part or feelers 1 and 2 have a different length and come into contact with the ground when the aircraft is respectively say at 8 m. and at 3 m. 50 over it. When the feeler 1 has come into contact with the ground, the contact 3 closes the electric circuit fed by the supply 4. The electromagnetic relay 5 will be thereby excited and attracts the armature 6. Consequently the contact 7 will be broken and the contacts 8, 9, 11 will be closed. Due to the shunt connection of contact 8 with reference to the circuit fed by 4, its closing will cause the relay 5 to remain excited and to continue attracting its armature even if current were to cease passing through the feeler (for instance through a breaking of the latter).

On the other hand the opening of contact 7 will break the current in the circuit of the horizontal balancer 12. In order to simplify the drawings we have shown a series of independent electric supplies. But of course the several apparatuses may be connected with the same supply. The closing of contact 9 sends current into the brush 13 rubbing on the conducting part 14 of the disc 15 rotating with the auxiliary motor 16 controlling the horizontal rudder 17. The conducting part 14 is connected with the electromagnet 18 controlling the auxiliary motor 16 which is thus started and continues rotating until the end $b$ of the conducting part 14 has passed under the brush 13. This corresponds to the moving of the horizontal rudder from its position 17 to its position $17^a$. At the same time the closing of the contact 11 closes the circuit of the electromagnet 19 controlling the auxiliary motor 21 actuating the throttling valve 22 of the carburetted gases so as to slow down the motor of the aircraft.

The moving of the horizontal rudder into its aircraft-rearing position and the slowing down of the motor provide automatically the operation termed by the pilots "the breaking of the downward line" and consisting in giving the aeroplane a greater angle of inclination so as to brake its movement. The aeroplane loses speed and continues moving downwards.

The second contact-bearing feeler 2 comes then into contact with the ground and closes the circuit of relay 25 which attracts its armature 26, opens the contact 27 and closes the contacts 29, 31. The closing of the contact 29 ensures the permanency of the excitation of the relay 25. The opening of contact 31 feeds current to the brush 32 disposed at a certain angle with reference to brush 13 over part 14 on the disc 15. Thus the electromagnet 18 is excited again and the auxiliary motor starts again until the end $b$ of the conducting sector 14 has passed under the brush 32. The horizontal rudder continuing its movement comes into its position $17^b$. This provides the "rounding of the path of the aircraft" i. e. its righting whereby the aircraft comes against the ground simultaneously through its wheels and sprags.

In certain aeroplanes adapted to land with a reduced speed, it may be sufficient to use the device shown on Fig. 2 which has a single feeler. When the aeroplane is at a certain height, say 5 m. above ground, the contact-bearing feeler 1', coming into contact with the ground closes the contact 3'. This provides the excitation of the relay 5', the closing of the contacts 8', 9', 11', and the opening of the contact 7. The current is cut off from the balancer 12' and is sent to the electromagnets 18' and 19'. The auxiliary motor 16' controlled by 18' gives the horizontal rudder 17' the position $17'_a$ whilst the auxiliary motor 21' throttles the gases feeding the propelling motor at 22'.

Fig. 3 shows a landing device similar to that shown on Fig. 1 but acting on the balancer. The aeroplane is thus balanced until it is completely stopped. The balancer may be of any known system, a compensated pendulum, a gyroscope, a weathercock, etc.

The balancer has two contact sectors 35 and 36 separated by the neutral point 37 and connected with the electromagnets 38 and 39 controlling the auxiliary motor 41 which causes the horizontal 42 to make the aeroplane rise or fall. The sectors 35 and 36 have a fixed direction in space.

An arm 43 is adapted to pivot round the center 44 of the sectors 35, 36 and carries three brushes. Brush 45 corresponds to the greatest raising inclination, brush 46 serves for breaking the downward movement and brush 47 for horizontal flying or for downward movement when required.

Constraining means 48 such as a cable passing over a pulley connect the arm 43 with the part 40 controlling the rudder 42. The remaining parts are similar to those shown on Fig. 1 and have been given similar reference numbers.

The working is as follows:

When the contact bearing feeler 1 touches ground the contact 3 closes and allows the relay 5 to be excited; consequently the armature 6 opens the contact 7 and closes the contacts 8, 9, 11. The opening of the contact 7 breaks the circuit of the brush 47. The closing of the contact 8 ensures the permanency of the excitation of the relay 5, that of the contact 11 sends current into the auxiliary motor 21 controlling the gas-throttling valve 22, that of the contact 9 sends current to the brush 46 which through the sector 36 excites the electromagnet 39 setting the rudder in its aeroplane raising position. The auxiliary motor 41 being operative, the lever 40 controlling the rudder is moved backwards and through the constraining means 48 returns the brush 46 into coincidence with the neutral point 37. The auxiliary motor stops, and the aeroplane is balanced in the position given by the rudder 42. If the aeroplane were to rear too much, the brush 46 comes against the sector 35 and feeds the electromagnet 38 which causes the auxiliary motor 41 to rotate in its aircraft lowering direction. The reverse action is provided when the aircraft has a too great downward slope. The line of descent of the aircraft is thus broken. When the feeler 2 is in contact with the ground, the relay 25 will be excited, the contacts 29 and 21 will be closed and the contact 27 opened. The opening of contact 27 cuts off the current through brush 46. The closing of the contact 29 ensures the permanency of the excitation of the relay 25 and that of contact 31 sends current to the brush 45 adapted to make the aircraft rear through the excitation of the electromagnet 39 fed through the sector 36 and controlling the auxiliary motor 41 which causes the angle of the rudder 42 to increase. The constraining means 48 bring the brush 45 in front of the neutral point 37.

The aircraft rounds its path of flight and lands simultaneously with its wheels and sprags.

If for any reason whatever the aircraft springs forward again the balancer returns the lever 40 forwards so as to prevent the aircraft from mounting sideways and from falling on its tail.

Like in the precedent case a simplified form of execution may be provided with a single feeler.

For certain aircrafts, we may add to the above described devices a third feeler 51 (Fig. 4) provided with a contact 52 which feeler is shorter than the two others and comes consequently in contact with the ground very little time before the wheels. We have noticed that for a proper landing it is of advantage to disconnect the auxiliary motors just before the wheels come into contact with the ground.

The closing of the contact 52 excites the electromagnet 53 which attracts its plunger core together with the lever 54 pivotally secured at 55. The lever 56 is released thereby and is brought forward into its motor disconnecting position by the spring 57.

Fig. 5 illustrates diagrammatically the case of a device comprising, like Fig. 1 two contact bearing feelers of unequal length 58, 59 provided with contacts 61, 62; but the closing of the circuits instead of causing automatically the starting of the auxiliary motors in view of landing lights indicating lights 61', and 62' in front of the pilot. This is of great interest particularly for pilot schools and for night landing when the pilot cannot see the ground.

When the pilot sees the lamp 61' is lit, he throttles partly the admission of gas into the aircraft motor and draws slightly the piloting lever inwards so as to break the line of descent. When the lamp 62' is illuminated in its turn, he draws it fully inwards and waits for the landing. Of course in this case also, a single feeler may be used with a single lamp.

Figs. 6 to 9 relates to the case where the feeler is a rod 64 pivotally secured to the body of the aircraft at 65 which allows it to be collapsed on the underside thereof. An adjustable stop 67 is adapted to hold this rod at the position required for its working. To avoid its coming too suddenly against this stop, it is of advantage to dispose between the rod 64 and aircraft any suitable damping device 68. This damping device may be of any known type acting with air, oil or glycerine. However it seems an air damper has the most constant action, at whatever altitude the aircraft flies i. e. to whatever temperature it is subjected.

Fig. 7 shows a device which may be used with advantage in lieu of the adjustable stop 67 and allows like the latter, a modification of the incline of the rod according to the speed of the wind, which is very important. This device comprises a cable 69 secured through one end to the rod 64 and wound through the other over a disc 71. By rotating the disc 71 in one direction or the other, the cable will be lengthened or shortened. Of course, once adjusted, the disc will be bolted by a suitable arrangement.

For releasing the rod at the desired moment, we may use the electric releasing device shown by way of example on Fig. 8. The frame 72 of an electromagnet 73 having a plunger core 74 is secured to a support 75 itself borne by the aircraft body and carrying a stationary strap 76. A rod 77 is pivotally connected on one hand to the strap 76 and on the other to the core 74 of the electromagnet 75. It is urged forwards by the adjustable spring 78. The end of a hook 79 is held down by the rod 77, said hook being pivotally secured to the stationary strap 81. This hook holds for instance through a chain 82 the rod (not shown). Thus as soon as the electromagnet 73 is excited, the rod 77 is attracted with the core 74, the hook 79 rocks and releases the chain 82 and therewith the rod.

Fig. 9 shows a form of execution of the lower end of a feeler rod which may be used with advantage. A plough share 83 is pivotally secured to the spindle 84 borne by the strap 85 secured to the rod 64. This plough share is held in its inoperative position by a spring 86 the tension of which may be adjusted through the knob 87 the rotation of which makes the screw 88 and therewith the strap 89 to which is secured the end of the spring 86, advance or recede. A spindle 91 prevents the strap 89 from rotating together with the knob 87. The end 92 of the plough share 83 may act on the push button 93 of a usual electric contact 94. The circuit is broken when the push-button is in the position shown. A strap 95 limits the fall of the plough share.

It is easily seen that when the plough share 83 comes against the ground, its inner end 92 comes against the push-button 93 and closes the electric circuit.

A disc 96 of rubber or other yielding material damps the shock of the plough share against the rod. On the other hand in order to prevent any damage to the end 92 of the plough share and to the contact 94 when the rod trails on the ground, a protecting cone 97 is added to the device.

Fig. 10 shows a less fragile feeler which is generally speaking more practical than a rod. It comprises an antenna 101 of very yielding and resistant thread not liable to be damaged by friction. This wire 10 is wound over a wheel 102 borne together with a ratchet wheel 103 by a stationary spindle 104. An electromagnet 105 makes the catch release the wheel and antenna during flight.

A spring 107 brakes the wheel 102, so that the latter cannot rotate too quickly and risk breaking the cable when quite unwound through the shock provided at this moment.

After passing off the wheel 102, the cable 101 passes through an eye or guide 108 secured to the aircraft. It passes then into another guide 109 disposed vertically underneath the guide 108. The guide 108 is secured to a rocking part comprising a lever 111 pivotally secured to a spindle 112 rigidly secured to the aircraft. A spring 113 is used for compensating the effect of the air pressure on the antenna.

An electric contact 114 provided with a push-button 115 for instance closes the electric circuit of the electromagnets to be excited. Lastly the antenna end is provided with at least three weights 116 disposed at a certain distance one from the other. This spacing prevents the antenna from rebounding too much after it has come into contact with the ground, due to the contrary action of the several weights at this moment.

The working is as follows:

When the aircraft starts, the antenna is wound on its wheel and the catch 108 controlled by the electromagnet 105 holds the ratchet wheel 103.

During flight, when it is considered time to unwind the antenna, the electromagnet 105 is excited so as to release the ratchet wheel. The wheel 102 begins rotating and the antenna is unwound. The spring 107 prevents the system from taking too great an acceleration.

When the aircraft moves downwards, the weights 116 strike the ground, the antenna is projected upwards and as it is held by the guide 108 presses against the guide 109 so as to make the lever 111 rock and push forwards the push button 115 of the contact 114 which closes the desired circuit.

What we claim is:

1. A landing device for aircraft comprising two feelers adapted to project by different lengths underneath the aircraft, a propelling motor and a horizontal rudder for the aircraft, electric means whereby the first feeler acts on the rudder for increasing the inclination of the aircraft and on the motor for slowing down the speed thereof; and further electric means controlled by the second shorter feeler and adapted to increase to a greater extent the inclination of the aircraft.

2. A landing device for aircraft comprising two feelers adapted to project by different lengths underneath the aircraft, a propelling motor and a horizontal rudder for the aircraft, electric means whereby the first feeler acts on the rudder for increasing the inclination of the aircraft and on the motor for slowing down the speed thereof and further electric means controlled by the second shorter feeler and adapted to increase to a greater extent the inclination of the aircraft, and a third feeler adapted when it comes in contact with the ground to disconnect both above described electric means.

3. A landing device for aircraft comprising feelers adapted to project underneath the aircraft, a propelling motor, a horizontal rudder and a balancer for the aircraft, auxiliary motors for the said rudder and for slowing down the speed of the propelling motor, a circuit adapted to be closed by the feelers when they come against the ground, means whereby said circuit when excited ensures the permanency of its own excitation, switches off the current passing through the balancer and starts both auxiliary motors and means whereby the rudder stops the auxiliary motor controlling it after it has moved by a predetermined angle.

4. A landing device for aircraft comprising feelers adapted to project underneath the aircraft, a propelling motor, a horizontal rudder and a balancer for the aircraft, auxiliary motors for the said rudder and for slowing down the speed of the propelling motor, a circuit adapted to be closed by the first feeler when it comes against the ground, means whereby said circuit when excited ensures the permanency of its own excitation, switches off the current passing through the balancer and starts both auxiliary motors, means whereby the rudder stops the auxiliary motor controlling it after it has moved by a predetermined angle, a circuit adapted to be closed by the second feeler, means whereby last mentioned circuit when excited ensures the permanency of its own excitation, breaks the first mentioned circuit, switches off the current passing through the balancer and makes the auxiliary motor of the rudder move the latter by a complementary angle.

5. A landing device for aircraft comprising wheels borne by the aircraft, an antenna wound over said wheels, weights urging down the outer end of the antenna, means for locking the antenna in its wound position, electric circuits, pivoting parts controlling said circuits and adapted to be brought in their circuit closing position by the antenna when the weights thereof strike the ground and electric landing means controlled by said circuits.

MAX BOUCHER.
RAOUL BERNADY.